United States Patent [19]

Sachs

[11] Patent Number: 5,035,100

[45] Date of Patent: Jul. 30, 1991

[54] WALL SLAB AND BUILDING CONSTRUCTION

[76] Inventor: Melvin H. Sachs, 5415 Fairway Lane, West Bloomfield, Mich. 48033

[21] Appl. No.: 223,156

[22] Filed: Jul. 22, 1988

Related U.S. Application Data

[63] Continuation of Ser. No. 18,763, Mar. 2, 1987, abandoned.

[51] Int. Cl.[5] .............................................. B29C 47/00

[52] U.S. Cl. ...................................... 52/741; 264/138; 264/148; 264/156; 264/157; 264/333; 52/607

[58] Field of Search ......................... 52/607, 741, 100; 264/333, 177.11, 177.12, 148, 149, 150, 151, 67, 138, 155, 156, 157

[56] References Cited

U.S. PATENT DOCUMENTS

| | | | |
|---|---|---|---|
| 791,875 | 6/1905 | Buente | 52/259 |
| 1,395,176 | 10/1921 | Close | 52/100 |
| 1,581,574 | 4/1926 | Heath | 52/100 |
| 2,075,038 | 3/1937 | Hutchinson | 264/145 |
| 2,398,267 | 4/1946 | Williams | 264/150 |
| 2,727,382 | 12/1955 | Kurz | 52/606 |
| 2,737,801 | 3/1956 | Barnhart | 52/606 |
| 2,951,318 | 9/1960 | Sedlak | 52/100 |
| 3,350,757 | 11/1967 | Bowles | 264/150 |
| 4,046,848 | 9/1977 | Putti | 264/177.11 |
| 4,334,397 | 6/1982 | Hitz | 52/442 |
| 4,379,380 | 4/1983 | Vetovitz | 52/259 |
| 4,743,414 | 5/1988 | Sudrabin | 52/309.17 |

FOREIGN PATENT DOCUMENTS

| | | | |
|---|---|---|---|
| 459516 | 9/1968 | Switzerland | 52/100 |

*Primary Examiner*—John E. Murtagh
*Attorney, Agent, or Firm*—Krass & Young

[57] ABSTRACT

A concrete slab, and a building construction system employing the concrete slab, in which the slab is formed in a casting or extrusion process to include a plurality of longitudinally extending core passages, and a groove extending transversely across one end face thereof. A plurality of invention slabs are stacked side by side to form a continuous wall structure, a plurality of conventional cored floor slabs are arranged with their one ends supported on the upper ends of the invention wall slabs, and concrete slurry is poured into the interface between the wall slabs and the floor slabs to fill at least some of the vertical core passages in the wall slabs and at least portions of the horizontal core passages in the floor slabs to form a continuous reinforcing concrete frame within the wall and floor. The concrete slabs provide a form for molding the reinforcing concrete frame and also add significantly the overall strength of the wall by providing a rigid concrete bridging structure between the vertical columns and horizontal bond beams of the reinforcing concrete frame.

11 Claims, 2 Drawing Sheets

FIG - 1
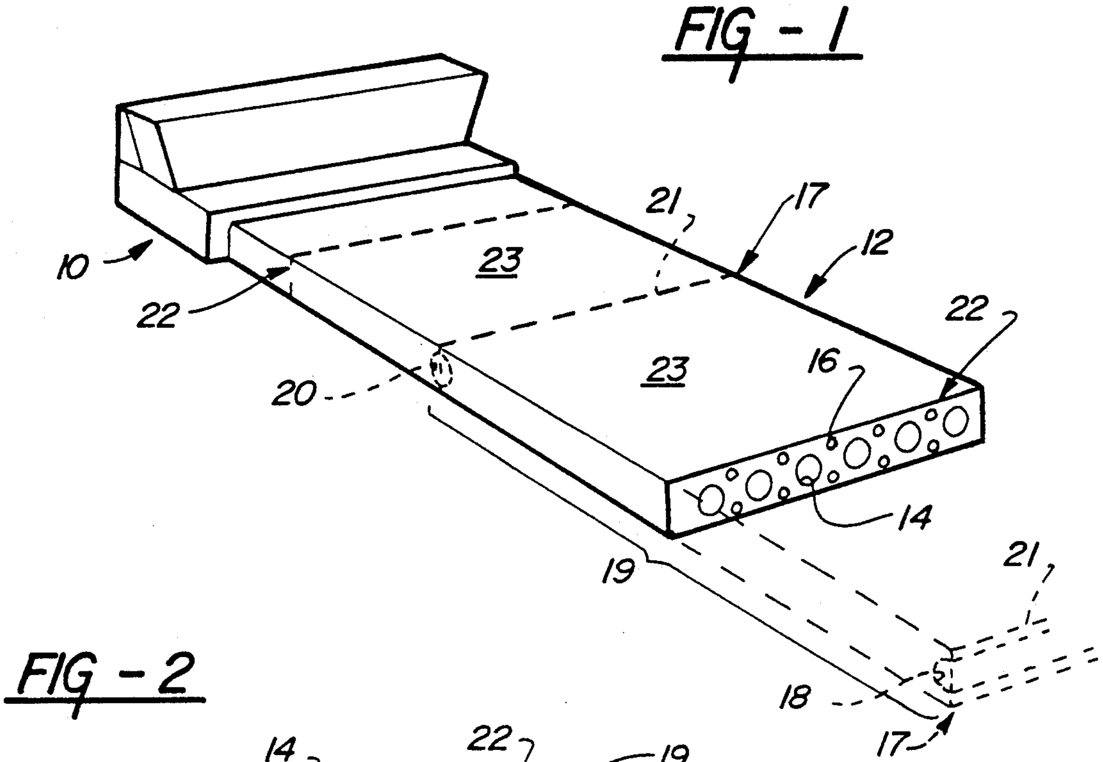
FIG - 2
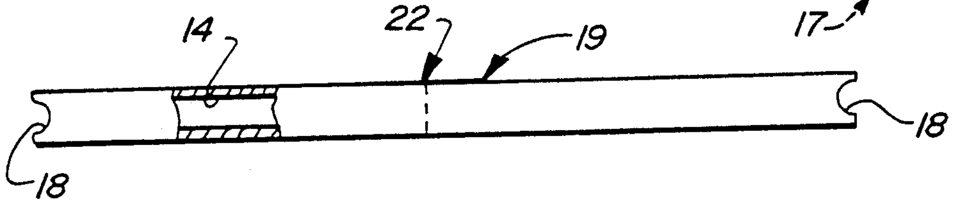
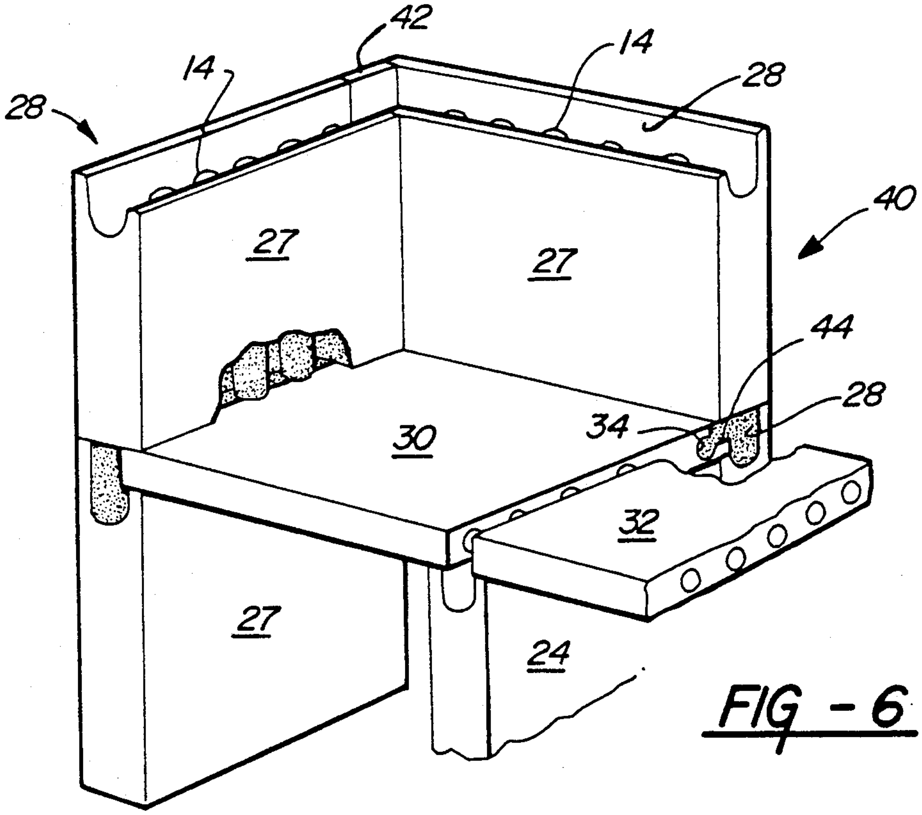
FIG - 6

FIG - 3
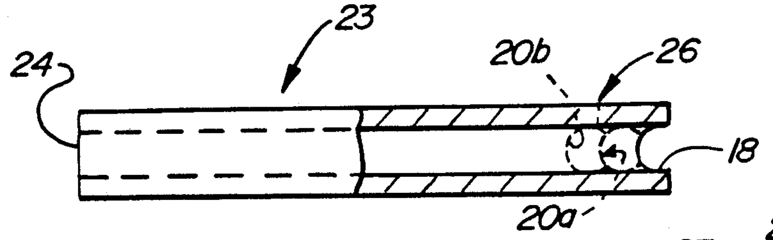
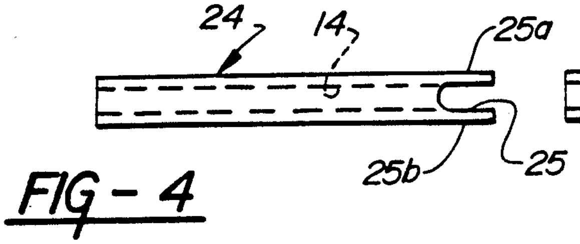
FIG - 4
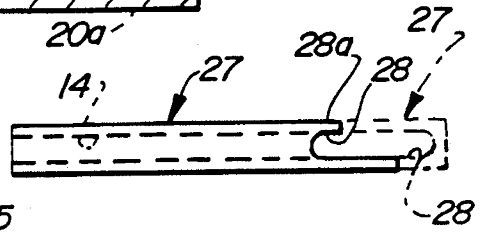
FIG - 5
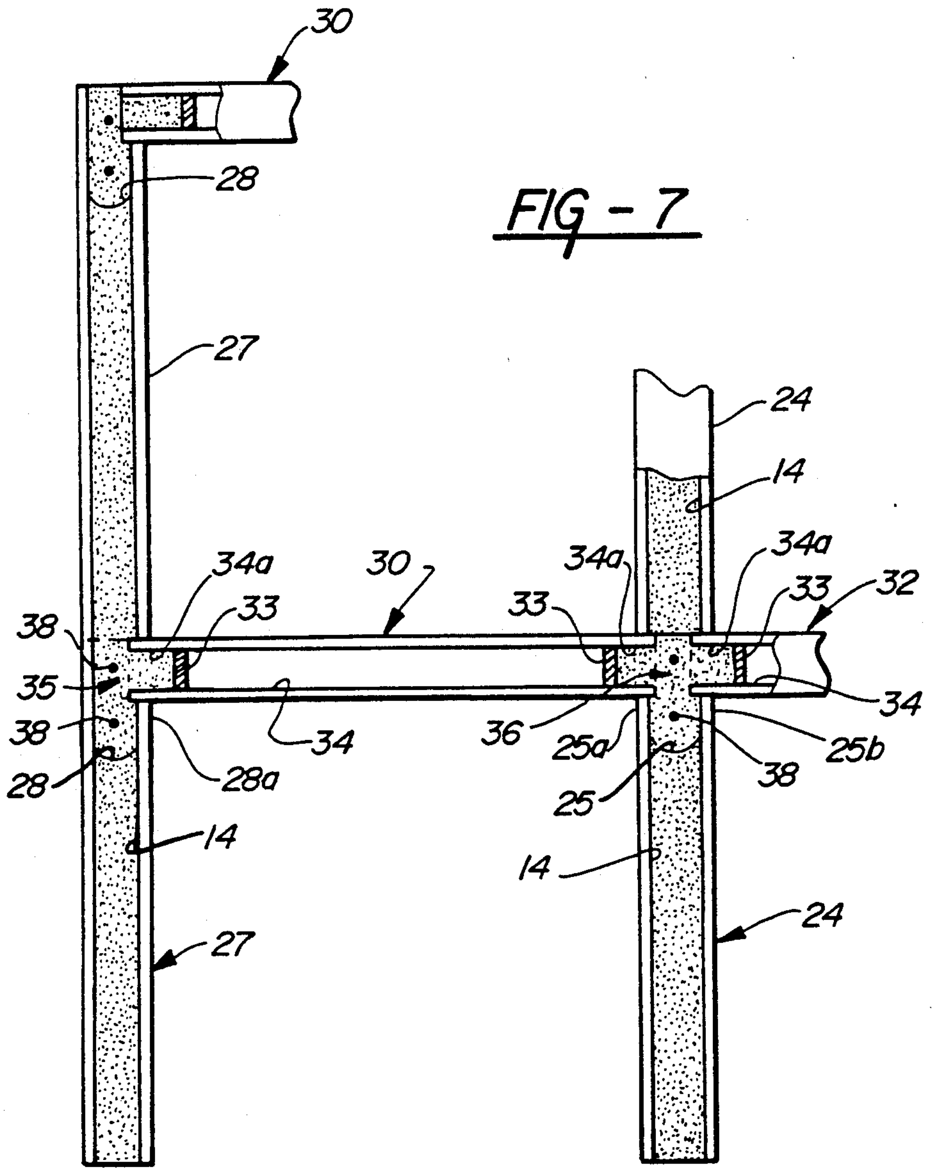
FIG - 7

WALL SLAB AND BUILDING CONSTRUCTION

This application is a continuation of application Ser. No. 018,763, filed Mar. 2, 1987, now abandoned.

BACKGROUND OF THE INVENTION

This invention relates to wall slabs and more particularly to wall slabs formed of concrete and suitable for use in creating concrete building structures.

Extensive efforts have been directed toward developing construction blocks of foam plastic having central voids adapted to receive concrete slurry. The blocks act as forms for molding the load supporting reinforced concrete frames and remain in place to provide the finished wall surfaces, insulation and vapor barrier. The foam plastic does not act as a load bearing member in the finished structure but simply acts to retain the concrete slurry in the form during the hardening or curing process. The lightweight of the plastic allows these blocks to be made in relatively large modules, and yet be handled manually without any special material handling equipment. The blocks are typically formed with interlocking configurations on their edges so that a plurality of blocks may be stacked relative to one another with their voids aligned to form continuous channels for the reception of the concrete slurry.

It has been proposed that these blocks be formed of polyurethane, polystyrene or other foam plastic materials. One obstacle to the widespread use of these blocks in construction has been the fact that all of these organic materials decompose to varying extents under sufficient heat, sometimes generating noxious gases. Some may additionally tend to support combustion to a degree.

Certain forms of porous inorganic materials exist such as stranded fiberglass which do not decompose to any appreciable extent under heat nor support combustion and it has been proposed that the lightweight block forms for reinforced concrete construction be formed of these materials. Blocks formed primarily of these inorganic materials do improve the fire resistance of a structure relative to the resistance of a structure formed of foam plastic blocks, but they create several new problems.

Specifically, these inorganic materials have substantially higher thermal conductivity than the foam plastic materials and accordingly the resultant structures are not nearly as well insulated per relative unit thickness of material. Further, inorganic foam materials in general, and those based on glass in particular, are very expensive and very brittle and may easily break in transit or when subjected to the forces created during vibration of the concrete slurry. Additionally the inorganic forms are not self-foaming, are much more difficult and expensive to mold than the foam plastics, and are much heavier as well.

It has also been proposed to form these blocks on a composite basis with a central core of a foam plastic sheathed on its four sides by inorganic foam material so that the organically based plastic foam is completely encased within the inorganic foam. Whereas these composite blocks eliminate the noxious foam problem of the foam plastic and improve the thermal conductivity properties of the block, they still retain the relatively brittle and easily breakable material at the outer surfaces of the block; the block is relatively expensive and complicated to manufacture; and the block is relatively difficult to handle.

It has also been proposed to fabricate these blocks from tubes and sheet metal structures as shown, for example, in U.S. Pat. No. 4,098,042. These fabricated blocks are quite expensive, however, and their load bearing capacity is quite limited.

BRIEF SUMMARY OF THE INVENTION

This invention is directed to the provision of a wall slab and integrated building construction system which substantially eliminates the described disadvantages of the prior art.

The invention is predicated on a slab formed of concrete and having a plurality of longitudinally extending parallel cores extending from end to end thereof and a transverse groove formed at at least one end of the slab, opening at that end of the slab and communicating with the longitudinal cores. In the use of this slab to provide a building construction system according to the invention, the slabs are stacked upon each other and along side of each other to form a vertical wall structure with the longitudinal cores and transverse grooves coacting to form a continuous cored matrix within the wall structure, and concrete fills the transverse grooves and at least some of the longitudinal cores. This arrangement and methodology produces a building wall in which the poured concrete provides a reinforcing concrete frame and the concrete slabs act as a form for the poured concrete and also act to supplement the load bearing capability of the reinforcing concrete frame. The overall strength of the structure is greatly improved as compared to the prior art in which the forms are provided by blocks formed of plastic or other non-load bearing materials. Specifically, this arrangement removes the prior art criticality with respect to the spacings between the columns of the reinforcing concrete frame, the strength of the concrete used, and the strength, size and number of reinforcing bars used in the columns and in the slabs since the concrete slabs themselves provide rigid load bearing interconnections between the columns of the reinforcing concrete frame. The described arrangement also eliminates the need for providing additional finishing on either surface of the slab.

The invention slabs may be formed in a continuous extrusion process wherein an elongated continuous slab is extruded with longitudinally extending cores, and the continuous slab is cut transversely at longitudinally spaced locations therealong in a manner to form a plurality of individual slabs having a transverse groove at at least one end face of each slab. For example, the continuous extruded slab may be drilled transversely at the longitudinally spaced locations and thereafter cut transversely at each drilling location in a manner to bisect the drilled passage and form substantially semicircular grooves in the adjacent end faces of the individual slabs. Alternatively, the invention concrete slab may be formed in a casting operation in which the longitudinally extending cores are formed in the casting operation and transversely extending passages are also formed in the casting operation at the longitudinally spaced locations along the slab whereafter the cast slab is cut transversely at the longitudinally spaced locations to form the individual slabs having a transverse groove at the cut end.

In practice, the transverse passages are formed in the continuous slab at locations spaced longitudinally therealong by a distance that is twice the length of the desired individual slabs so that the continuous slab, when transversely severed at the longitudinally spaced locations, yields a plurality of slab sections having a transverse groove at each end and having a length that is twice the length of the desired final slab. The double length sections are thereafter transversely severed at their midpoint to form a plurality of individual slabs having a transverse groove at one end and a flat end face at the other end.

According to a further aspect of the invention, a method of forming a building is provided in which a plurality of concrete slabs are formed each having a plurality of generally parallel core passages extending longitudinally therethrough from end to end thereof; a vertical wall of the building is formed by placing a plurality of the slabs in side by side arrangement with the core passages extending vertically; a floor of the building is formed by placing a plurality of the slabs side by side with core passages extending horizontally and one end edge of each floor slab supported on the upper end edge of the vertical wall slabs; and at least some of the vertically extending core passages of the wall slabs and at least portions of at least some of the horizontally extending core passages of the floor slabs are filled with concrete to form a continuous interconnected reinforcing concrete matrix within the slabs which coacts with the concrete material of the slabs to form a rigid building structure.

According to a further aspect of the invention, certain of the slabs are formed with a transverse groove extending across one end face thereof; the grooved slabs are used to form the vertical wall structure with the transverse grooves at the upper end of the slabs; and concrete fills the transverse grooves so that the reinforcing concrete matrix within the wall structures includes a continuous poured concrete bond beam occupying the transverse grooves and extending the full width of the vertical wall.

BRIEF DESCRIPTION OF THE DRAWINGS

FIG. 1 is a schematic perspective view of an extruding machine and a continuous slab formed by the extruding machine;

FIG. 2 is a view of a slab section formed in accordance with the invention;

FIG. 3 is a fragmentary view of a final individual concrete slab according to the invention;

FIGS. 4 and 5 are views of further individual concrete slabs according to the invention;

FIG. 6 is a fragmentary perspective view of a building formed in accordance with the structure and methodology of the invention; and FIG. 7 is a cross sectional view of the building shown in perspective in FIG. 6.

DETAILED DESCRIPTION OF THE PREFERRED EMBODIMENT

FIG. 1 shows an extruding machine 10 of known form extruding a continuous length of concrete slab 12 having performed parallel longitudinally extending core channels 14 therein and reinforcing rods or cables 16 extending parallel to the core channels. After extrusion of the continuous slabs, the slab is cut transversely at locations 17 spaced longitudinally therealong by a distance that is twice the length of the desired final slabs in a manner to cut through the continuous slab and form a transverse groove 18 in the adjacent end faces of the slab sections 19 defined between successive locations 17. The cutting at locations 17 may be accomplished by drilling the slabs transversely at the locations 17 to provide transverse drilled passages 20 extending all the way through the slab and intersecting cores 14 and thereafter cutting the slab transversely, as seen at 21, through each drilled passage or bore 20 to form the slab sections 19 (FIG. 2) having a transverse groove 18 at each end face. Slab sections 19 are thereafter cut through transversely at their longitudinal midpoints 22 to form the final individual slabs 23 having a flat end face 24 and a groove 18 in the other end face. The slab 12 may be formed in a continuous length as long as 500 feet so that a large number of individual slabs 23 may be produced in a single extrusion operation.

Passages 20 are preferably drilled with a diameter equal to or slightly more than the diameter of the longitudinal cores 14 and, in any event, must be sized and positioned so as to pass between, and not interfere with, the reinforcing cables 16. Bores 20 may be drilled at any time but the preferred time would be after the concrete has achieved its initial set but before it has achieved much strength. Performing the drilling operation before the slab has achieved significant strength allows the use of lower strength/quality drills and/or the use of lower horsepower drilling equipment. Cuts 21 preferably bisect passages 20 so that grooves 18 are substantially semicircular. Cuts 21 and 22 are made after the drilling process has been completed and after the concrete slab 12 has cured sufficiently to be cut. The drilled and cut slabs are removed from the extrusion and casting site for storage and/or usage in forming a building construction according to the invention.

As a practical matter, and in contemplation of a building construction of the type seen in FIGS. 6 and 7, a plurality of successively deeper passages **20*a*, 20*b* etc. are made at each location 17 to form a slab 24 (FIG. 4) having a deep U groove 25 at its grooved end and certain of the slabs are additionally cut transversely at 26 to form a slab 27 (FIG. 5) having a J-shaped groove 28** at its grooved end.

As an alternative to drilling passages 20 at each location 17 and thereafter making transverse cuts 21, the continuous slab 12 may be cut at each location 17 by the use of a water jet which is programmed to selectively cut through the slab in a manner to sever the slab sections while simultaneously forming the desired end groove configuration 18, 25, or 28. When using a programmed water jet, and as seen in FIG. 5, the jet may be programmed to make a single continuous cut to form end to end slabs 27 with the J grooves 28 in the adjacent slabs formed as mirror images of each other.

As a further alternative, continuous slab 12 may be formed in a casting operation in which the slab is cast on a very long bed with continuous core channels 14 provided by suitable cores associated with the bed and transverse passages 20 provided by further cores associated with the bed so that the continuous slab, as cast, includes longitudinal core passages 14 and transverse passages 20. The continuous cast slab may thereafter be cut through transversely at 21 to form slab sections 19 and thereafter cut through transversely at 22 to form the final individual slabs 23.

A building constructed using the slab structure and methodology of the invention is seen in FIGS. 6 and 7. Broadly considered, the building is formed by placing a plurality of slabs 27 side by side to form a vertical outside wall of the building; placing a plurality of slabs 24 side by side to form a vertical interior wall of the building; placing a plurality of conventional cored floor slabs 30 side by side so that their outer ends are supported on the truncated flange portion 28*a* of exterior slabs 27 and their inner ends are supported on the flange portion 25*a* of interior wall slabs 24; placing a further plurality of conventional cored floor slabs 32 in side by side relation so that their inner ends are supported on the flange portions 25*b* of interior wall slabs 24 (and their outer ends are suitably supported by a further interior or exterior wall, not shown); placing plugs 33 in core channels 34 of floor slabs 30 and 32 at locations spaced inwardly from each end of the slabs; and then pouring a concrete slurry into the interface area 35 between the floor slabs 30 and exterior wall slabs 27 and into the interface area 36 between floor slabs 30 and 32 and interior wall slabs 24. At the interface 35 of slabs 27 and 30, the slurry fills the longitudinal core channels 14, the J-shaped transverse grooves 28, and the end portions 34*a* of core channels 34 of floor slabs 30. The slurry poured into the interface 36 of floor slabs 30 and 32 and interior wall slabs 24 fills the longitudinal core channels 14 in the slabs 24, the U-shaped transverse grooves 25 in the slabs 24, and the end portions 34*a* of the core channels 34 of floor slabs 30 and 32. Horizontal or inforcing rods 38 are typically placed in the interface 35 between the outer slabs 28 and floor slabs 30 and the interface 36 between floor slabs 30 and 32 and inner wall slabs 24 to provide increased structural rigidity. The poured concrete slurry, once hardened, provides a continuous interconnected reinforcing concrete matrix within the slabs which coacts with the concrete material of the slabs to form a rigid building structure. Since the invention slabs provide not only the forms for the poured concrete but also themselves provide a building structure having considerable strength, it is often possible, depending upon the building strength requirements, to plug certain of the longitudinal core passages 14 so that the slurry fills only some of the core passages 14 and/or to use a lower strength concrete slurry than would be required if the slabs providing the form for the poured concrete were formed of a non-load bearing material.

If a further building floor is desired, additional slabs 27 and 24 are positioned over the corresponding exterior and interior walls slabs; additional floor slabs 30 are positioned to span the upper ends of the additional slabs 27 and 24, and further concrete slurry is poured into the interface between the further external slabs 27 and the floor slabs 30 and into the interface between the further interior slabs 24 and the wall slabs 30 with the concrete filling the grooves 28 in the outside wall slabs, the grooves 25 in the inside wall slabs, and the end portions 34*a* of the core channels 34 of the floor slabs 30. Additional floors may be added as desired with the slurry poured for each floor bonding rigidly with the previously poured slurry of the previous floors to form a continuous interconnected reinforcing concrete matrix interconnecting all of the vertical and horizontal slabs of the several floors. As seen in FIG. 6, further slabs 27 may be stacked side by side and on top of each other to form an end wall 40 with the side edges of floor slabs 30 coacting with the J-shaped grooves 28 in the slabs 27 of end wall 40 in a manner similar to the coaction between slabs 30 and the vertical wall slabs 27 of wall 28. A plug 42 is provided at the exterior end of the slabs 27 forming end wall 40 to contain the slurry poured into the J-shaped channels 28 of the slabs 27. The side edges of the floor slabs 30, 32 coacting with the slabs 27 forming end wall 40 are broken away at 44 so that the slurry in the adjacent J shaped grooves 28 may flow into and fill the outer most core passages 34 in the floor slabs 30, 32 to firmly lock the side edges of the floor slabs to the outside vertical end wall 40.

The invention building slab and methodology will be seen to provide a structure in which the slabs not only provide a form for the poured concrete reinforcing frame but also, by virtue of the inherent strength of the concrete material of the slabs, add significantly to the overall strength of the total building structure, thereby permitting the use of lower strength concrete and/or the use of fewer or smaller or lower quality reinforcing rods and/or the use of slurry in only selected longitudinal core passages 14.

The building structure formed by the invention slabs and the reinforcing concrete frame is significantly stronger in all measureable respects than the prior art building structures formed by the use of prior art plastic slabs or composite slabs, eliminates the need for providing surfacing treatments on the interior and exterior surfaces of the slabs as required in the case of the prior art slabs, avoids the decomposition problems associated with the use of the prior art plastic slabs; provides a simpler and less expensive slab as compared to the composite sheathed slabs utilized in certain of the prior art structures of this type; and provides superior fire resistance as compared to the plastic and/or fiberglass slabs employed in the prior art constructions. The invention slab and building construction methodology will thus be seen to provide a simple, inexpensive, effective method of forming a building.

Whereas a preferred embodiment of the invention has been illustrated and described in detail, it will be apparent that various changes may be made in the disclosed embodiment without departing from the spirit or scope of the invention.

I claim:

1. A method of forming a plurality of building slabs comprising:

forming a longitudinally elongated flat continuous slab having upper and lower flat faces and side edges and having a width as measured between said side edges substantially exceeding its height as measured between said upper and lower faces;

forming a plurality of longitudinally extending core passages in said slab;

cutting said continuous slab transversely from side edge to side edge thereof at locations spaced longitudinally therealong to form a plurality of individual flat slab sections each having side edges, upper and lower faces, end faces, and longitudinally extending core passages; and forming a transverse groove in one end face of each slab section extending from side edge to side edge of the slab between said upper and lower faced opening in said side edges and in said one end face, and intersecting said longitudinally extending core passages.

2. The method of claim 1 wherein said cutting and groove forming steps comprise:

forming a transverse passage in said continuous slab at each such location; and cutting said continuous slab transversely at each passage by cutting through the passage.

3. The method according to claim 1 wherein:

said continuous slab is formed of concrete.

4. The method of claim 3 wherein:

said continuous slab is formed in a casting process;

said longitudinally extending core passages are also formed in the casting process; and said transverse passages are generally circular in cross section and the transverse cuts made in said continuous slab substantially bisect the respective transversed passages to form substantially semi-circular grooves in the adjacent end faces of the individual slabs.

5. A method according to claim 1 wherein:

said cutting step is performed using a water jet.

6. A method of forming a plurality of individual concrete slabs comprising the steps of:

forming a longitudinally elongated flat continuous concrete slab having upper and lower faces and side edges and having a width as measured between said side edges substantially exceeding its height as measured between said upper and lower faces;

forming a plurality of longitudinally extending core passages in said slab;

cutting said continuous slab transversely from side edge to side edge thereof at locations spaced longitudinally therealong by a distance that is twice the length of the desired individual slabs to form a plurality of individual flat slab sections each having side edges, upper and lower faces, end faces, and longitudinally extending core passages;

forming a transverse groove in each end face of each slab section with each groove extending from side edge to side edge of the slab between said upper and lower faces, opening in said side edges and in the respective end face, and intersecting said longitudinally extending core passages; and cutting each such slab section transversely through at its longitudinal midpoint to form a plurality of individual slabs having a transverse groove in one end face thereof.

7. The method according to claim 5 wherein:

said continuous slab is formed in a casting operation:

said cutting and groove forming steps are performed by forming transverse passages of generally circular cross section in said continuous slab at said longitudinally spaced locations during the casting operation; and thereafter cutting the slab transversely through at each said location in a manner to substantially bisect the respective transverse passage and thereby form grooves in the adjacent end faces of the individual slabs.

8. A method of forming a plurality of building slabs comprising:

A. forming an elongated continuous slab;

B. cutting said continuous flab transversely at locations spaced longitudinally therealong in a manner to form a plurality of individual slabs each having a transverse groove opening at least one end face of the slab;

C. said cutting step comprising forming a transverse passage in said continuous slab at each such location and cutting said continuous slab transversely at each passage by cutting through the passage;

D. said continuous slab being formed with a plurality of longitudinally extending core passages;

E. said transverse passages intersecting said longitudinal core passages to form a matrix of interconnecting longitudinal and transverse passages within said continuous slab;

F. said continuous slab and said longitudinal core passages being formed in an extrusion process;

G. said transverse passage being formed in a drilling operation; and

H. the transverse cuts made in said continuous slab substantially bisecting the respective drill passages to form substantially semicircular grooves in the adjacent end faces of the individual slabs.

9. A method of forming a plurality of individual concrete slabs comprising the steps of:

forming an elongated continuous concrete slab;

cutting said continuous slab transversely at locations spaced longitudinally therealong by a distance that is twice the length of the desired individual slabs and in a manner to cut thιough the continuous slab and form a transverse end groove in the adjacent end faces of the slab sections thus formed;

cutting each such slab section transversely through at its longitudinal midpoint to form a plurality of individual slabs having a transverse groove in one end face thereof;

said concrete slab being formed in an extrusion process; and the cutting of the continuous slab at said longitudinally spaced locations comprising drilling said slab transversely at each said longitudinally spaced location to form a drilled transverse passage at each said location and thereafter cutting transversely through said slab at each said location in a manner to substantially bisect the respective transverse passages to form substantially semicircular transverse grooves in the adjacent end faces of the resulting individual slabs.

10. The method according to claim 9 wherein:

F) said drilling step is performed after the concrete has achieved its initial set but before it has achieved a full cure.

11. A method of forming a plurality of building slabs comprising:

forming a longitudinally elongated flat continuous slab having upper and lower flat faces and side edges and having a width as measured between said side edges substantially exceeding its height as measured between said upper and lower faces;

forming a plurality of longitudinally extending core passages in said slab;

cutting said continuous slab transversely from side edge to side edge thereof at locations spaced longitudinally therealong to form a plurality of individual flat slab sections each having side edges, upper and lower faces, end faces; and forming a transverse groove in one end face of each slab section extending from side edge to side edge of the slab between said upper and lower faced and opening in said side edges and in said one end face;

said cutting and groove forming steps comprising forming a transverse passage in said continuous slab at each such location and cutting said continuous slab transversely at each passage by cutting through the passage;

said transverse forming step being performed after the concrete has achieve its initial set but before it has achieved a full cure;

said cutting step being performed after said transverse passage forming step.

* * * * *